United States Patent [19]

Patsch et al.

[11] Patent Number: 5,681,937
[45] Date of Patent: Oct. 28, 1997

[54] REACTIVE AZO DYES WITH A COUPLING COMPONENT FROM THE AMINONAPHTHALENESULFONIC ACID SERIES

[75] Inventors: Manfred Patsch, Wachenheim; Heike Kilburg, Speyer; Andrea Zamponi, Heidelberg, all of Germany

[73] Assignee: BASF Aktiengesellschaft, Ludwigshafen, Germany

[21] Appl. No.: 622,588

[22] Filed: Mar. 26, 1996

[30] Foreign Application Priority Data

Mar. 30, 1995 [DE] Germany .................. 195 11 691.7

[51] Int. Cl.[6] .................. C09B 62/096; C09B 62/507; D06P 1/38
[52] U.S. Cl. .................. 534/642; 534/603; 534/605; 534/612; 534/633; 534/638
[58] Field of Search .................. 534/638, 637, 534/642

[56] References Cited

U.S. PATENT DOCUMENTS

| | | | |
|---|---|---|---|
| 3,925,351 | 12/1975 | Meninger et al. | 534/642 |
| 4,002,606 | 1/1977 | Schläfer et al. | 534/642 |
| 4,035,351 | 7/1977 | Schläfer et al. | 534/642 |
| 4,036,825 | 7/1977 | Fuchs et al. | 534/642 |
| 4,066,638 | 1/1978 | Fuchs et al. | 534/642 |
| 4,191,687 | 3/1980 | Austin | 534/638 |
| 4,534,908 | 8/1985 | Fuchs et al. | 534/642 X |

FOREIGN PATENT DOCUMENTS

| | | |
|---|---|---|
| 0 637 615 | 2/1995 | European Pat. Off. . |
| 44 34989 | 4/1996 | Germany . |

*Primary Examiner*—Fiona T. Powers
*Attorney, Agent, or Firm*—Oblon, Spivak, McClelland, Maier & Neustadt, P.C.

[57] ABSTRACT

Reactive dyes of the formula

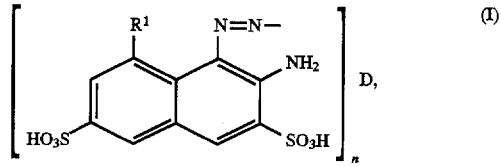

where n is 1 or 2
$R^1$ is hydrogen or hydroxyl and
D is the radical of a diazo or tetrazo component with, in each case, at least one anchor radical of the formula $SO_2$—Y where Y is vinyl or substituted ethyl, and the use thereof for dyeing or printing organic substrates having hydroxyl groups or nitrogen atoms are described.

12 Claims, No Drawings

REACTIVE AZO DYES WITH A COUPLING COMPONENT FROM THE AMINONAPHTHALENESULFONIC ACID SERIES

The present invention relates to novel reactive dyes of the formula I

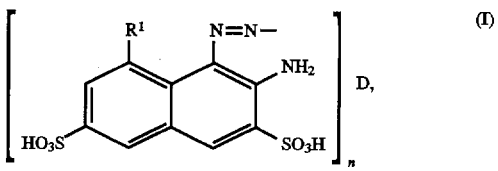

where
n is 1 or 2
$R^1$ is hydrogen or hydroxyl and
D is, when n is 1, a radical of the formula

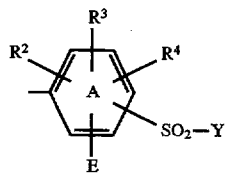

or, when n is 2, a radical of the formula

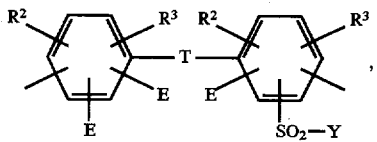

where ring A can be benzo-fused, $R^2$, $R^3$ and $R^4$ are each, independently of one another, hydrogen, $C_1$–$C_4$-alkyl, $C_1$–$C_4$-alkoxy, halogen or hydroxysulfonyl, E is hydrogen, a heterocyclic anchor radical or an anchor radical from the aliphatic series, Y is vinyl or a radical of the formula $C_2H_4$-Q where Q is a group which can be eliminated under alkaline conditions, and T is a linker, with the proviso that, when n is 1, $R^1$ is hydroxyl and $R^2$, $R^3$ and $R^4$ are each hydrogen, E is neither hydrogen nor a radical of the formula $SO_2$—Y, $W^1$—$SO_2$—Y or $CONX$—$W^1$—$SO_2$—Y where Y has in each case the abovementioned meanings, and $W^1$ is in each case $C_1$–$C_4$-alkylene and X is hydrogen or $C_1$–$C_4$-alkyl, and to the use thereof for dyeing or printing organic substrates having hydroxyl groups or nitrogen atoms.

EP-A 637 615 discloses dyes which have a similar structure to those of the formula I (n=1, $R^1$=hydroxyl). However, the dyes described therein differ in the substitution pattern in the diazo component.

Earlier German Patent Application P 44 34 989.0 relates, inter alia, to reactive dyes with a coupling component from the 3-hydroxysulfonylnaphthalene series which have a substituted amino group in ring position 7 and may additionally have a hydroxyl and sulfo group.

It is an object of the present invention to provide novel reactive dyes derived from phenyl- or naphthaleneazonaphthalene dyes. The intention is that the novel dyes be distinguished by an advantageous profile of use properties.

We have found that this object is achieved by the reactive dyes of the formula I defined at the outset.

The novel reactive dyes of the formula I are in each case indicated in the form of the free acid. Their salts are, of course, also embraced by the patent claims.

Suitable cations are derived from metal or ammonium ions. Metal ions are, in particular, lithium, sodium or potassium ions. Ammonium ions mean, for the purpose of the invention, unsubstituted or substituted ammonium cations. Examples of substituted ammonium cations are monoalkyl-, dialkyl-, trialkyl-, tetraalkyl- or benzyltrialkylammonium cations or cations derived from nitrogen-containing 5- or 6-membered saturated heterocycles such as pyrrolidinium, piperidinium, morpholinium or piperazinium cations or their N-monoalkyl- or N,N-dialkyl-substituted products. In this connection, alkyl generally means straight-chain or branched $C_1$–$C_{20}$-alkyl which may be substituted by hydroxyl groups and/or interrupted by oxygen atoms in ether functionality.

All the alkyl and alkylene radicals occurring in the present application may be either straight-chain or branched.

When substituted alkyl groups occur in the present application, as a rule they have 1 or 2 substituents.

When substituted phenylene groups occur in the present application, possibly suitable substituents are, unless otherwise indicated, for example $C_1$–$C_4$-alkyl, $C_1$–$C_4$-alkoxy, halogen, hydroxysulfonyl, sulfamoyl or $C_1$–$C_4$-mono- or dialkylsulfamoyl. As a rule, they then have from 1 to 3, preferably 1 or 2, substituents.

Examples of $R^2$, $R^3$ and $R^4$ radicals are methyl, ethyl, propyl, isopropyl, butyl, isobutyl, sec-butyl, tert-butyl, methoxy, ethoxy, propoxy, isopropoxy, butoxy, isobutoxy or sec-butoxy.

The radical Q is a group which can be eliminated under alkaline conditions. Examples of such groups are chlorine, bromine, $C_1$–$C_4$-alkylsulfonyl, phenylsulfonyl, $OSO_3H$, $SSO_3H$, $OP(O)(OH)_2$, $C_1$–$C_4$-alkylsulfonyloxy, unsubstituted or substituted phenylsulfonyloxy, $C_1$–$C_4$-alkanoyloxy, $C_1$–$C_4$-dialkylamino or a radical of the formula

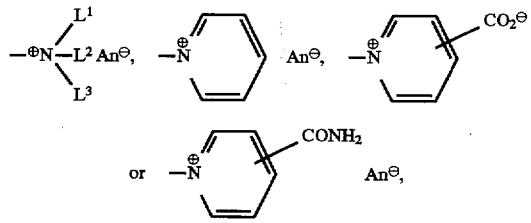

where $L^1$, $L^2$ and $L^3$ are each, independently of one another, $C_1$–$C_4$-alkyl or benzyl and An⊖ is in each case one equivalent of an anion. Examples of suitable anions in this connection are fluoride, chloride, bromide, iodide, mono-, di- or trichloroacetate, methanesulfonate, benzenesulfonate or 2- or 4-methyl-benzenesulfonate.

The radicals E within a molecule can be identical or different. Anchor radicals E are those which react by displacement or addition with the hydroxyl groups or nitrogen-containing groups on the substrates to be treated. Moreover, $C_2H_4$—Q reacts to give vinyl under the alkaline reaction conditions.

Reaction by displacement of the anchor radical with the relevant groups in the substrates, eg. with the hydroxyl groups on cellulose, means that the leaving groups or atoms (eg. fluorine or chlorine) in the anchor radical are displaced by the hydroxyl groups of the cellulose as shown in the following diagram:

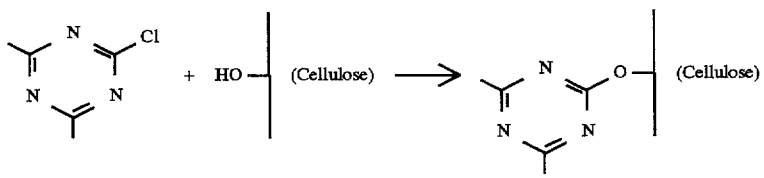

Reaction by addition of the anchor radical with the relevant groups in the substrates, eg. with hydroxyl groups on cellulose, means that the hydroxyl groups of the cellulose add on to the anchor radical as shown in the following diagram:

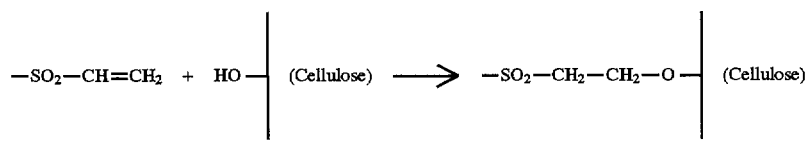

Examples of heterocyclic anchor radicals E are halogen-substituted radicals of 1,3,5-triazine, quinoxaline, phthalazine, pyrimidine or pyridazine, or the 2-alkylsulfonylbenzothiazole radical.

The following heterocyclic radicals may be mentioned by way of example.

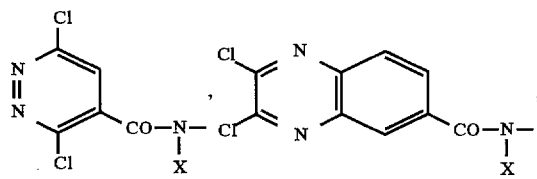

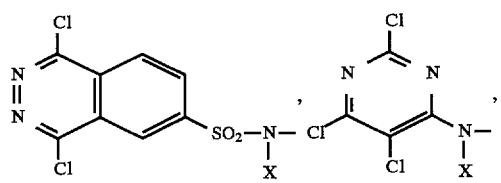

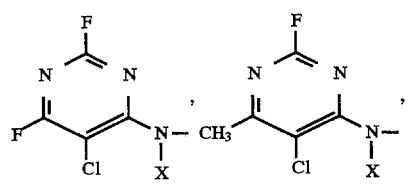

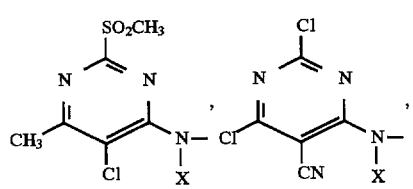

-continued

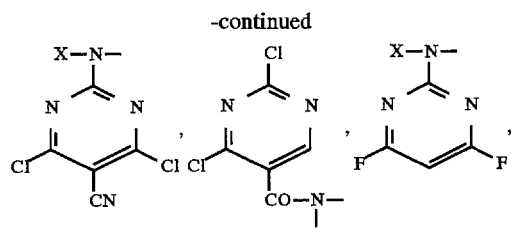

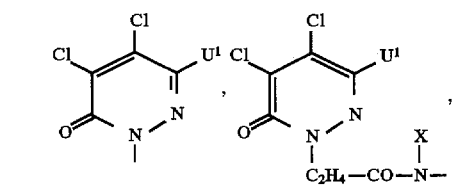

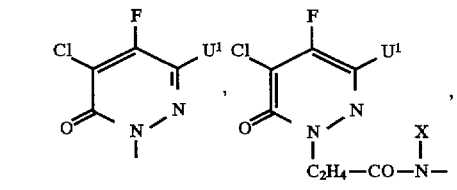

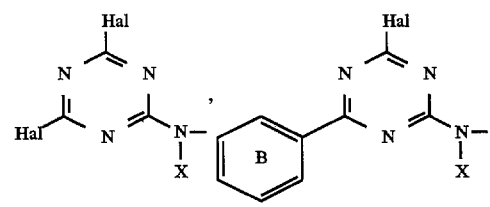

-continued

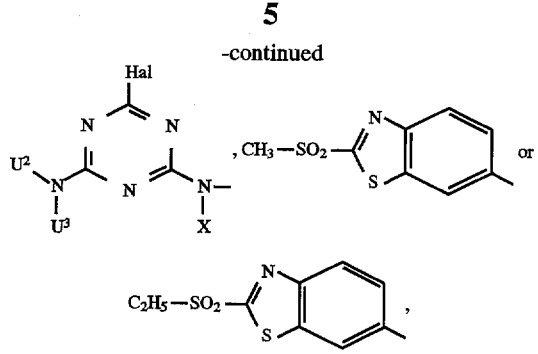

where

X is hydrogen or $C_1$–$C_4$-alkyl,

Hal is fluorine or chlorine, $U^1$ is hydrogen or nitro and $U^2$ and $U^3$ are each, independently of one another, hydrogen, $C_1$–$C_6$-alkyl which is unsubstituted or substituted by hydroxyl, halogen, cyano, hydroxysulfonyl or a radical of the formula —$SO_2$—Y where Y has the abovementioned meanings, and can be interrupted in each case by 1 or 2 oxygen atoms in ether functionality, imino or $C_1$–$C_4$-alkylimino groups, or $U^2$ and $U^3$ are, together with the nitrogen atom connecting them, pyrrolidinyl, piperidinyl, morpholinyl, piperazinyl or N-($C_1$–$C_4$-alkyl)piperazinyl or $U^2$ is also a radical of the formula

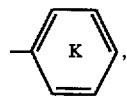

where the rings B and K can each be substituted once or twice by hydroxysulfonyl and can be benzo-fused, and ring K can, independently thereof, be substituted once or twice by chlorine, nitro, $C_1$–$C_4$-alkyl, $C_1$–$C_4$-alkoxy, cyano, carboxyl, acetylamino, hydroxysulfonylmethyl or a radical of the formula $CH_2$—$SO_2$—Y, $SO_2$—Y, NH—CO—Y or $NU^2$—CO—$NU^2$—Z—$SO_2$—Y where Y and $U^2$ each have the abovementioned meanings, and Z is $C_2$–$C_6$-alkylene which is unsubstituted or substituted by hydroxyl, chlorine, cyano, carboxyl, $C_1$–$C_4$-alkoxycarbonyl, $C_1$–$C_4$-alkanoyloxy or sulfato and can be interrupted by in each case 1 or 2 oxygen atoms in ether functionality or imino or $C_1$–$C_4$-alkylimino groups.

Examples of anchor radicals E from the aliphatic series are acryloyl, mono-, di- or trichloroacryloyl, mono-, di- or tribromoacryloyl, —CO—CCl=CH—COOH, —CO—CH=CCl—COOH, 2-chloropropionyl, 1,2-dichloropropionyl, 1,2-dibromopropionyl, 3-phenylsulfonylpropionyl, 3-methylsulfonylpropionyl, 2-sulfatoethylaminosulfonyl, 2-chloro-2,3,3-trifluorocyclobutylcarbonyl, 2,2,3,3-tetrafluorocyclobutylcarbonyl, 2,2,3,3-tetrafluorocyclobutylsulfonyl, 2-(2,2,3,3-tetrafluorocyclobutyl)acryloyl, 1- or 2-alkyl- or -arylsulfonylacryloyl such as 1- or 2-methylsulfonylacryloyl, or a radical of the formula $SO_2$—Y, $W^1$—$SO_2$—Y, CONX—$W^2$—$SO_2$—Y or NXCONX—$W^2$—$SO_2$—Y where X and Y each have the abovementioned meanings, $W^1$ is $C_1$–$C_4$-alkylene and $W^2$ is $C_1$–$C_4$-alkylene or unsubstituted or substituted phenylene.

Examples of $W^1$ and $W^2$ radicals are $CH_2$, $(CH_2)_2$, $(CH_2)_3$, $(CH_2)_4$, $CH(CH_3)CH_2$ or $CH(CH_3)CH(CH_3)$.

Further examples of $W^2$ radicals are 1,2-, 1,3- or 1,4-phenylene.

T in formula I is a linker. Suitable linkers obey, for example, the formula

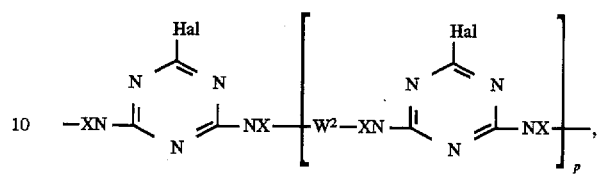

—NX—Z—NX—, —NX—CO—NX, CO or $SO_2$, where p is 0 or 1, and Hal, $W^2$, X and Z each have the abovementioned meanings.

Linkers which should be particularly mentioned are radicals of the formula

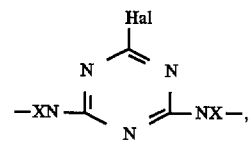

CO or $SO_2$, and CO or $SO_2$ should be emphasized.

When n is 2, D preferably obeys the formula

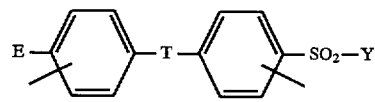

where E, Y and T each have the abovementioned meanings.

Further preferred reactive dyes of the formula I are those where $R^1$ is hydroxyl.

Further preferred reactive dyes of the formula I are those where $R^2$, $R^3$ and $R^4$ are each hydrogen.

Further preferred reactive dyes of the formula I are those where E is hydrogen, an anchor radical from the 1,3,5-triazine series or a radical of the formula $SO_2$—Y where Y has the abovementioned meanings.

Further preferred reactive dyes of the formula I are those where, when n is 2, T is a radical of the formula CO or $SO_2$.

Further preferred reactive dyes of the formula I are those where n is 1.

Further preferred reactive dyes of the formula I are those where ring A is not benzo-fused.

Particularly preferred reactive dyes of the formula I are those where E is hydrogen or a radical of the formula $SO_2$—Y where Y has the abovementioned meanings.

Further particularly preferred reactive dyes of the formula I are those where the radical of the formula $SO_2$—Y is in the position ortho to the azo group.

Further particularly preferred reactive dyes are those of the formula Ia

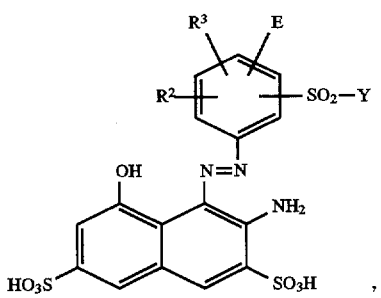

where $R^2$ and $R^3$ are each, independently of one another, hydrogen or hydroxysulfonyl, and E and Y each have the abovementioned meanings.

Particularly interesting reactive dyes are those of the formula Ia where E is hydrogen or a radical of the formula $SO_2$—Y, with hydrogen being particularly important, and $R^2$ and $R^3$ are each hydroxysulfonyl.

The novel reactive dyes of the formula I can be obtained by conventional methods.

For example, an aniline of the formula IIa or IIb

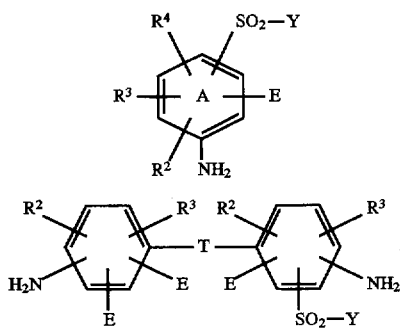

where ring A, $R^2$, $R^3$, $R^4$, E, Y and T each have the abovementioned meanings, can be diazotized or tetrazotized in a conventional way and coupled with an aminonaphthalene of the formula III

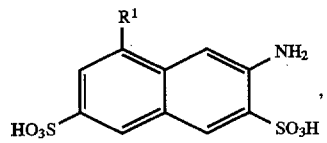

where $R^1$ has the abovementioned meanings in each case.

The anilines of the formula IIb can be obtained by conventional methods, for example as described in the earlier German Patent Application P 195 08 311.3.

The novel reactive dyes of the formula I are advantageously suitable for the dyeing or printing of organic substrates having hydroxyl groups or nitrogen atoms. Examples of substrates of this type are leather or fiber material which predominantly contains natural or synthetic polyamides or natural or regenerated cellulose. The novel dyes are preferably suitable for dyeing and printing textile material based on wool or, in particular, cotton. Dyeings in red hues are obtained.

Dyeings in particular on cellulose-based substrates have intense colors and very high fixation yields and display very good light fastness and excellent wet fastness properties such as fastness to washing, chlorine bleaches, peroxide bleaches, alkalis, sea water or sweat.

The following examples are intended to explain the invention in detail.

EXAMPLE 1

33.1 g of 3-(2-sulfatoethylsulfonyl)aniline-4,6-disulfonic acid were stirred in 100 ml of ice-water, 10 ml of 10N hydrochloric acid were added and, while stirring at 0°–5° C., diazotization was carried out by dropwise addition of 15 ml of 23% by weight aqueous sodium nitrite solution. After stirring at 0°–5° C. for 2 h, the small excess of free nitrous acid was decomposed by adding sulfamic acid, and the diazonium salt solution was maintained at 0°–5° C. until the coupling.

16.9 g of 1-hydroxy-7-aminonaphthalene-3,6-disulfonic acid were stirred in 100 ml of ice-water. The diazonium salt solution was added dropwise to this solution while keeping the pH at 2.5–3 with sodium acetate. After the reaction was complete, the mixture was allowed to warm to room temperature and then the pH was adjusted to 4.5–5 using sodium bicarbonate. 50 g of sodium chloride were then added to the solution, which was then stirred for 4 h. The precipitate which had formed was filtered off and dried to result in 24.6 g of the dye of the formula

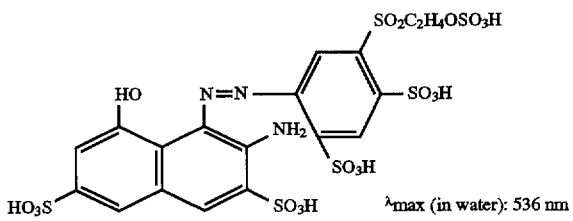

$\lambda_{max}$ (in water): 536 nm

EXAMPLE 2

15.5 g of 3-(2-sulfatoethylsulfonyl)aniline were stirred in 100 ml of ice-water, 10 ml of 10N hydrochloric acid were added 40 and, while stirring at 0°–5° C., diazotization was carried out by dropwise addition of 15 ml of 23% by weight aqueous sodium nitrite solution. After stirring at 0°–5° C. for 2 h, the small excess of free nitrous acid was decomposed by adding sulfamic acid, and the diazonium salt solution was maintained at 0°–5° C. until the coupling. 27.6 g of 2-aminonaphthalene-3,6-disulfonic acid were stirred in 100 ml of ice-water. The diazonium salt solution was added dropwise to this solution while keeping the pH at 2.5–3 with aqueous sodium carbonate solution. After the reaction was complete, the mixture was allowed to warm to room temperature and then the pH was adjusted to 4.5–5 using sodium bicarbonate. 25 g of sodium chloride were then added to the solution, which was then stirred for 4 h. The precipitate which had formed was filtered off and dried to result in 24.2 g of the dye of the formula

$\lambda_{max}$ (in water): 466 nm

The dyes listed in the following table were obtained in a similar way.

| Ex. No. | R¹ | D | $\lambda_{max}$ (in water) [nm] |
|---|---|---|---|
| 3 | OH | 2,4-disulfo-5-(SO₂C₂H₄OSO₃H)-phenyl | 480 |
| 4 | H | 2-(SO₂C₂H₄OSO₃H)-phenyl | 474 |
| 5 | H | 2-(SO₂C₂H₄OSO₃H)-4,6-disulfo-phenyl (2-SO₂C₂H₄OSO₃H, 3-SO₃H, 5-SO₃H) | 496 |
| 6 | H | 3-(SO₂C₂H₄OSO₃H)-phenyl | 452 |
| 7 | H | 2,4-disulfo-5-(SO₂C₂H₄OSO₃H)-phenyl | 456 |

Structure (Ex. 3–7):

R¹ at 8-position, N=N-D at 1-position, NH₂ at 2-position, SO₃H at 3-position, HO₃S at 6-position of naphthalene.

-continued

| Ex. No. | R¹ | D | $\lambda_{max}$ (in water) [nm] |
|---|---|---|---|
| 8 | H | 2,4-bis(SO₂C₂H₄OSO₃H)-phenyl | 510 |

Structure (Ex. 8): R¹ at 8-position, N=N-D at 1-position, NH₂ at 2-position, SO₃H at 3-position, HO₃S at 6-position of naphthalene.

EXAMPLE 9

30.2 g of 3,3-diamino-4,4-bis(2-sulfatoethylsulfonyl) benzophenone were stirred in 200 ml of ice-water, 30 ml of 10N hydrochloric acid and 100 ml of glacial acetic acid were added and, while stirring at 0°–5° C., tetrazotization was carried out with 31 ml of 23% by weight aqueous sodium nitrite solution. After stirring at 0°–5° C. for 3 h, the slight excess of free nitrous acid was decomposed by adding sulfamic acid. 57.5 g of 2-aminonaphthalene-3,6-disulfonic acid were added, and the pH was kept at 3–3.5 with sodium carbonate. After the reaction was complete, the mixture was allowed to warm to room temperature and the pH was adjusted to 5–5.5 with sodium carbonate. 50 g of sodium chloride were added to the solution, which was then stirred for 4 h. The red precipitate was filtered off and dried to result in the dye of the formula

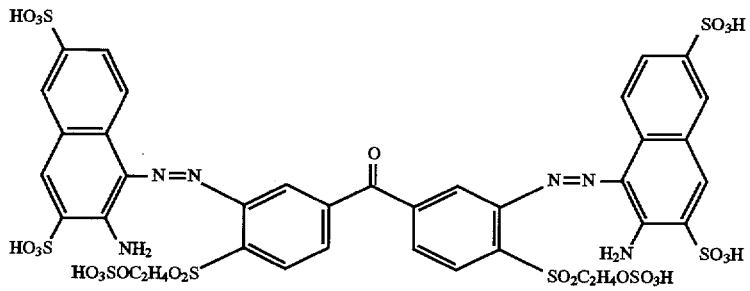

$\lambda_{max}$ (in water): 494 nm

EXAMPLE 10

The procedure was similar to Example 9 but an equivalent amount of 2-amino-8-hydroxynaphthalene-3,6-disulfonic acid was used, resulting in the dye of the formula

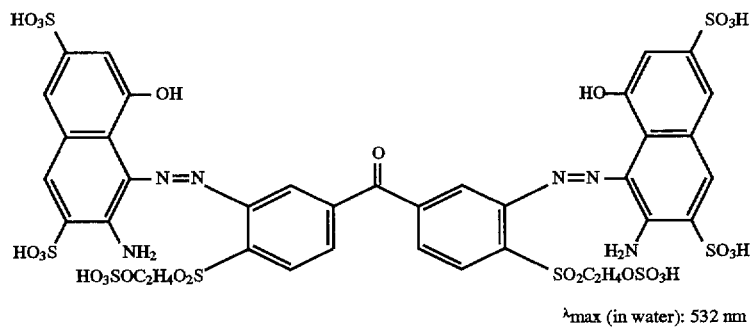

$\lambda_{max}$ (in water): 532 nm

EXAMPLE 11

The procedure was similar to Example 9 but the carbonyl compound was replaced by the corresponding sulfonyl compound as tetrazo component, and the naphthalene derivative mentioned in Example 10 was used as coupling component, resulting in the dye of the formula

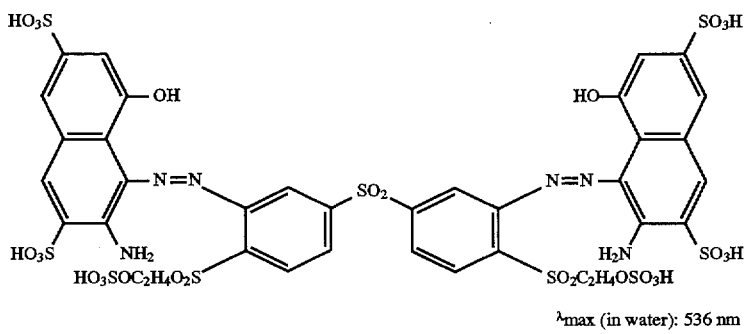

$\lambda_{max}$ (in water): 536 nm

We claim:

1. A reactive dye of the formula I

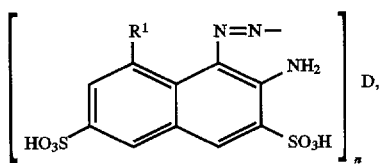

where n is 1 or 2, $R^1$ is hydrogen or hydroxyl and

D is, when n is 1, a radical of the formula

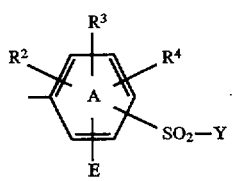

or, when n is 2, a radical of the formula

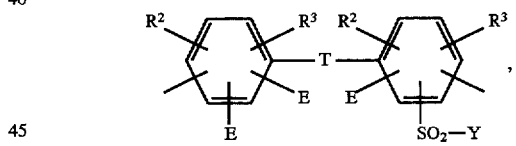

where ring A optionally is benzo-fused, $R^2$, $R^3$ and $R^4$ are each, independently of one another, hydrogen, halogen or hydroxysulfonyl, E is hydrogen, a heterocyclic anchor radical or an anchor radical from the aliphatic series, Y is vinyl or a radical of the formula $C_2H_4$—Q where Q is a group which can be eliminated under alkaline conditions, and T is a linker, with the proviso that, (i) when n is 1, $R^1$ is hydroxyl and $R^2$, $R^3$ and $R^4$ are each hydrogen, then E is neither hydrogen nor a radical of the formula $SO_2$—Y, $W^1$—$SO_2$—Y or CONX—$W^1$—$SO_2$—Y where Y has in each case the abovementioned meaning, and $W^1$ is in each case $C_1$–$C_4$-alkylene and X is hydrogen or $C_1$–$C_4$-alkyl and with the proviso (ii) that when n=1 and $R^1$=hydrogen, then E is not hydrogen.

2. A reactive dye as claimed in claim 1, wherein $R^1$ is hydroxyl.

3. A reactive dye as claimed in claim 1, wherein $R^2$, $R^3$ and $R^4$ are each hydrogen.

4. A reactive dye as claimed in claim 1, wherein, when n is 2, T is a radical of the formula CO or $SO_2$.

5. A reactive dye as claimed in claim 1, wherein n is 1.

6. A reactive dye as claimed in claim 1, wherein E is hydrogen or a radical of the formula SO$_2$—Y where Y has the meanings specified in claim 1.

7. A reactive dye as claimed in claim 1, wherein the radical of the formula SO$_2$—Y is in the position ortho to the azo group.

8. The reactive dye of claim 1, wherein group Q is a member selected from the group consisting of chlorine, bromine, C$_1$–C$_4$-alkylsulfonyl, phenylsulfonyl, OSO$_3$H, SSO$_3$H, OP(O)(OH)$_2$, C$_1$–C$_4$-alkylsulfonyloxy, unsubstituted or substituted phenylsulfonyloxy, C$_1$–C$_4$-alkanoyloxy, C$_1$–C$_4$-dialkylamino or a radical of the formula

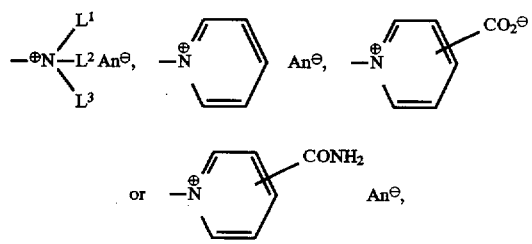

where L$^1$, L$^2$ and L$^3$ are each, independently of one another, C$_1$–C$_4$-alkyl or benzyl and An$^\ominus$ is in each case one equivalent of an anion.

9. The reactive dyes as claimed in claim 1, wherein the heterocyclic anchor radical of group E is a member selected from the group consisting of

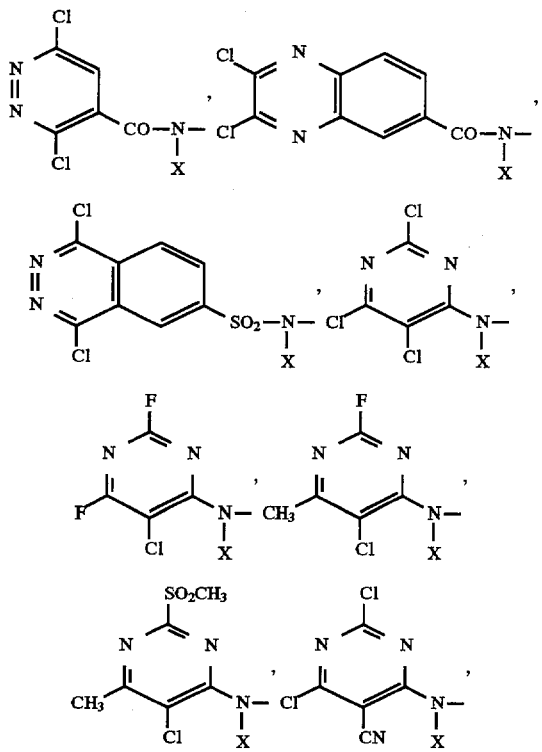

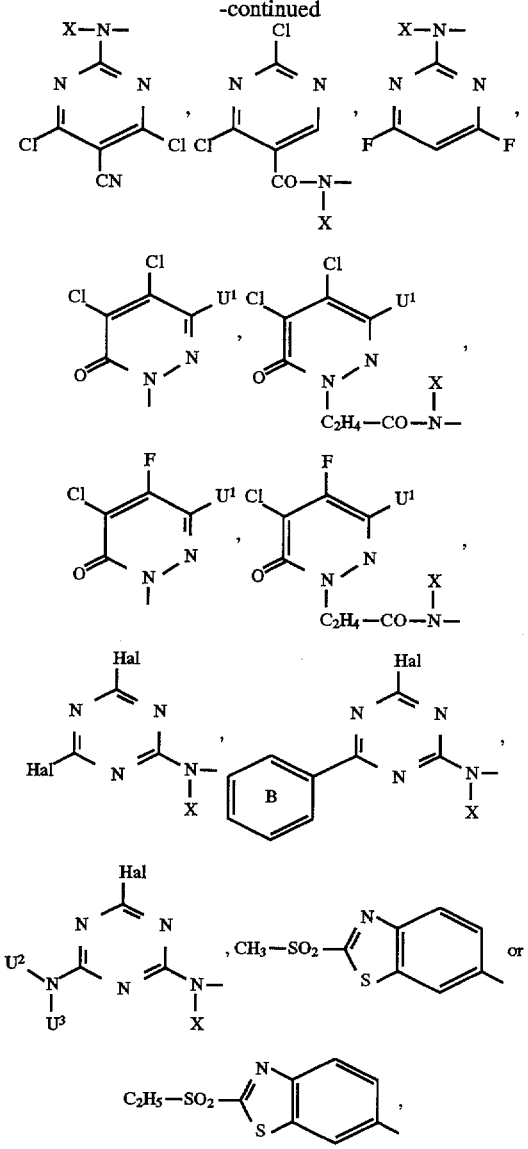

where
X is hydrogen or C$_1$–C$_4$-alkyl,
Hal is fluorine or chlorine,
U$^1$ is hydrogen or nitro and
U$^2$ and U$^3$ are each, independently of one another, hydrogen, C$_1$–C$_6$-alkyl which is unsubstituted or substituted by hydroxyl, halogen, cyano, hydroxysulfonyl or a radical of the formula —SO$_2$—Y where Y has the abovementioned meanings, and may be interrupted in each case by 1 or 2 oxygen atoms as ether functionality, imino or C$_1$–C$_4$-alkylimino groups, or U$^2$ and U$^3$ are, together with the nitrogen atom connecting them, pyrrolidinyl, piperidinyl, morpholinyl, piperazinyl or N—(C$_1$–C$_4$-alkyl)piperazinyl or U$^2$ is a radical of the formula

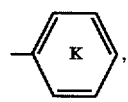

where the rings B and K may each be substituted once or twice by hydroxysulfonyl and may be benzo-fused, and ring K may, independently thereof, be substituted once or twice by chlorine, nitro, $C_1$–$C_4$-alkyl, $C_1$–$C_4$-alkoxy, cyano, carboxyl, acetylamino, hydroxysulfonylmethyl or a radical of the formula $CH_2$—$SO_2$—Y, $SO_2$—Y, NH—CO—Y or $NU^2$—CO—$NU^2$—Z—$SO_2$—Y where Y and $U^2$ each have the abovementioned meanings, and Z is $C_2$–$C_6$-alkylene which is unsubstituted or substituted by hydroxyl, chlorine, cyano, carboxyl, $C_1$–$C_4$-alkoxycarbonyl, $C_1$–$C_4$-alkanoyloxy or sulfato and can be interrupted by in each case 1 or 2 oxygen atoms as ether functionality or imino or $C_1$–$C_4$-alkylimino groups.

10. The reactive dye as claimed in claim 1, wherein said anchor radical E of the aliphatic series is a member selected from the group consisting of acryloyl, mono-, di- or trichloroacryloyl, mono-, di- or tribromoacryloyl, —CO—CCl=CH—COOH, —CO—CH=CCl—COOH, 2-chloropropionyl, 1,2-dichloropropionyl, 1,2-dibromopropionyl, 3-phenylsulfonylpropionyl, 3-methylsulfonylpropionyl, 2-sulfatoethylaminosulfonyl, 2-chloro-2,3,3-trifluorocyclobutylcarbonyl, 2,2,3,3-tetrafluorocyclobutylcarbonyl, 2,2,3,3-tetrafluorocyclobutylsulfonyl, 2-(2,2,3,3-tetrafluorocyclobutyl)acryloyl, and 1- or 2-alkyl- or arylsulfonylacryloyl.

11. A method of dyeing or printing an organic substrate, comprising:

dyeing or printing said organic substrate which has hydroxyl groups or nitrogen atoms with the reactive dye of claim 1.

12. The method of claim 11, wherein said organic substrate is leather, natural or synthetic polyamide or natural or regenerated cellulose.

* * * * *